US012573261B2

(12) United States Patent
Negussie et al.

(10) Patent No.: US 12,573,261 B2
(45) Date of Patent: Mar. 10, 2026

(54) SYSTEM AND METHOD FOR MONITORING, AGGREGATING AND LIMITING INDIVIDUAL USER CREDIT ACCOUNTS FOR WAGERING, ONLINE GAMING AND IGAMING

(71) Applicant: RESPONSIBLE TECHNOLOGY LLC (DE), Wilmington, DE (US)

(72) Inventors: Brook Negussie, Ft. Lauderdale, FL (US); Ralph J. Ianuzzi, Jr., Ft. Lauderdale, FL (US)

(73) Assignee: RESPONSIBLE TECHNOLOGY LLC (DE), Wilmington, DE (US)

( * ) Notice: Subject to any disclaimer, the term of this patent is extended or adjusted under 35 U.S.C. 154(b) by 347 days.

(21) Appl. No.: 17/925,236

(22) PCT Filed: May 28, 2021

(86) PCT No.: PCT/US2021/034992
§ 371 (c)(1),
(2) Date: Nov. 14, 2022

(87) PCT Pub. No.: WO2021/243286
PCT Pub. Date: Dec. 2, 2021

(65) Prior Publication Data
US 2023/0230447 A1     Jul. 20, 2023

Related U.S. Application Data

(60) Provisional application No. 63/034,431, filed on Jun. 4, 2020, provisional application No. 63/032,480, filed on May 29, 2020.

(51) Int. Cl.
*G07F 17/32*     (2006.01)
*G06Q 20/34*     (2012.01)
(Continued)

(52) U.S. Cl.
CPC ......... *G07F 17/3237* (2013.01); *G06Q 20/34* (2013.01); *G06Q 20/405* (2013.01); *G06Q 50/34* (2013.01); *G07F 17/3255* (2013.01)

(58) Field of Classification Search
CPC . G07F 17/3237; G07F 17/3255; G06Q 50/34; G06Q 20/405; G06Q 20/34
See application file for complete search history.

(56) References Cited

U.S. PATENT DOCUMENTS

| | | | | |
|---|---|---|---|---|
| 10,643,426 B2 * | 5/2020 | Higgins | ............. | G07F 17/3251 |
| 2019/0340875 A1 * | 11/2019 | Higgins | ............. | G06Q 20/3224 |
| 2020/0035065 A1 * | 1/2020 | Ellis | .................. | G07F 17/3225 |

* cited by examiner

*Primary Examiner* — David L Lewis
*Assistant Examiner* — Shauna-Kay Hall
(74) *Attorney, Agent, or Firm* — Amster, Rothstein & Ebenstein LLP

(57) ABSTRACT

A sponsored system and method for a user of gaming portals to place wagers to voluntarily establish with the assistance of the system sponsor an appropriate gambling budget for the user and to voluntarily limit the available aggregate of debt to a personalized credit limit so that the user's predetermined gambling budget is not exceeded. The compulsive gambler and/or electronic gaming player is protected by the system's identification of gambling risk patterns and/or electronic gaming habits. The system provides a "risk backstop" to prevent the accrual of debt from betting or electronic game playing that is beyond the individual user's financial capacity.

10 Claims, 5 Drawing Sheets

(51) Int. Cl.
    *G06Q 20/40*          (2012.01)
    *G06Q 50/34*          (2012.01)

SYSTEM AND METHOD FOR MONITORING, AGGREGATING AND LIMITING INDIVIDUAL USER CREDIT ACCOUNTS FOR WAGERING, ONLINE GAMING AND IGAMING

FIELD OF THE INVENTION

This disclosure relates to the fields of legalized wagering, gambling, and iGaming conducted in government sanctioned and regulated casinos and via online gaming and iGaming entities in which the individual gambler, or "user," participates directly or indirectly via a credit facility such as a bank, financial services provider and/or a credit/debit card company, and also to competitive electronic game tournaments conducted as games of skill that require payment of entry fees for participation, but typically do not involve gambling 'activities.

It will be understood that, as used in the following description and claims, the term "user" refers to an individual player, gambler or iGamer participating in any of the wide variety of wagering, gambling and online gaming activities made available by licensed providers throughout the world. The term "sponsor" refers to the entity that establishes and maintains a system, and "subscribers" are any of a variety of entities that request and are permitted by the sponsor to have access to information regarding a user's gaming activities and credit. As used herein, the term "business subscriber" includes "gaming portals" and "registered gaming portals," credit facilities, credit rating bureaus, and other interested parties.

In the description that follows, the terms "iGaming" and "e-gaming", "online gaming" and "internet gaming" may be used interchangeably in referring to wagering or betting on the outcome of a game or event via the internet.

BACKGROUND OF THE ART

Systems are known for the administration of a non-wagering account associated with a gaming environment to affect substantially real-time crediting and debiting of a gaming account maintained in a gaming environment and structured to communicate by a private restricted communication link with an issuing financial institution of a stored value account to affect real-time crediting and debiting of the stored value account. See, e.g., U.S. Pat. No. 8,708,809.

Systems are known for affecting balance transfers associated with gaming environments for selectively increasing and decreasing the balances of gaming accounts and stored value accounts. Each of the gaming account and the stored value account are associated with a player. The stored value account is associated with a stored value payment vehicle that is issued to the player. Instructions for balance transfers can be provided by the player to a remote computing device. See, e.g., U.S. Pat. No. 9,196,123.

Systems are also known for gaming account funding for associating a player identifier with a financial account. The financial account can hold funds that are accessible through the player's use of a payment vehicle that can be a credit payment vehicle or a debit payment vehicle. The player can load funds from the financial account to a wagering account. See, e.g., U.S. Pat. No. 9,990,801.

The systems described above function to transfer an individual gambler's funds from a funded account and to return winnings to one or more accounts without regard to the source of the funds deposited into the funded account. Online Gaming and Wagering Online gaming has been adopted and accepted on a worldwide basis and is subject to governmental regulation by the granting of licenses to qualified online gaming operating organizations. Online gaming can be practiced from the comfort of one's living room, in an iGaming parlor devoted to the activity, and in brick-and-mortar casinos. It has been widely recognized that, in general, individual and group participation in all types of Internet interactive games can become addictive to certain personality types. Online wagers can be made very easily from a home computer, and betting on all of the major U.S. sports games can be conducted every day via online sportsbooks. Many side options are available to online sports betting players. In addition to sports betting, online poker has become widely accepted, and bets can be placed on horse racing and a wide variety of casino games. As a result of technological gains, money can be sent and received very quickly and securely. Online sites have proved to be reliable and secure, and as a result, many individuals regularly engage in the activity, often to their detriment.

Fund Transfers for iGaming

The funds for online gambling can come from a debit card account, an online account, e.g., PayPal®, Zelle® and the like, an electronic check, certified check, money order, wire transfer, or even cryptocurrencies. Historically, it has been an established practice for a prospective patron of a particular gaming establishment, e.g., a brick-and-mortar casino, to apply in advance of visiting the establishment for a line of credit in a specified amount, relying on funds in a specified bank account. Upon verification by the casino operator, the patron will be extended a predetermined line of credit in connection with gaming activities at the casino for a specified period of time.

Normally, online gamblers upload funds to the online gaming platform, make bets or play the games that it offers, and then cash out any winnings. Gamblers can often fund gambling accounts by credit card or debit card, and then cash out winnings directly back to the card account; most U.S. banks, however, prohibit the use of their credit cards for the purpose of internet gambling, and attempts by Americans to use credit cards at internet gambling sites are usually rejected. A number of U.S. electronic money services do offer accounts with which online gambling can be funded.

People with gambling addictions often end up deep in debt which often goes beyond money owed to casinos or other gambling operations. The debt can take the form of credit card debt, personal loan debt and even home equity debt that are all associated with, and derive from, gambling problems. A major source of the debt is due to the extension of credit and/or "markers" by casinos and other gambling operations that only focus on the user's income and/or liquid assets, while failing to take into account ordinary household budget requirements such as the need to pay rent or make mortgage payments, to buy food, to pay for medical insurance, and also failing to take into account extraordinary budget items such as a person who provides financial support to aged parents.

Casinos have been named as defendants in lawsuits brought by family members of debtors for allegedly promoting the accumulation of unaffordable debt leading to the loss of the family's home and other property. While such suits are typically settled, casino operators must bear the expenses of litigation and any cash paid in settlement.

It has been reported that beginning in April of 2020, the United Kingdom banned the use of credit cards to place bets in an attempt to curb the problem of unaffordable debt gambling according to the British Gambling Commission.

Examples of consumers who had accumulated tens of thousands of pounds of debt through gambling because of credit card availability was identified as a particular source of the problem.

Recent legislation in the Commonwealth of Puerto Rico established strict regulations, player and consumer protection and governmental licensing of internet wagering. Specifically mentioned in the background discussion are esports and fantasy leagues. One provision of the law, Article 2.3, Section 12, requires the Commission to take measures to ensure the protection of the compulsive player, including technology to identify risk patterns and prevent betting when the potential loss is beyond the financial capacity of the player.

The problem of online wagering, whether via sportsbooks or other online vehicles, is the accrual of excessive credit card debt that exceeds the gambler's capability to repay. The existing problem is the result of the relative ease and availability to the gambler of continuing to accrue debt on credit card accounts, the only limit being that established by a given credit card issuer. In general, the issuer has not established the maximum credit limit based on knowledge of other credit cards owned by the user, the current credit limits on cards obtained from other issuers, or the user's proclivities to "over-indulge" in gambling and gaming activities.

It will be understood from the above, that there is a need for a method and system that will assist an individual who has recognized and admitted the problem and wishes to effectively limit and specifically control the availability of credit to the individual for gaming purposes.

SUMMARY OF THE INVENTION

The above problems are addressed and other advantages are realized by the methods and systems of the present disclosure which also provides a safe and secure wagering and transaction system and platform.

The present disclosure broadly contemplates a system and method to identify and solicit participation of individuals who wish to voluntarily establish a limit on the amount of credit that will be available from customary credit facilities to support the individual's online gambling and gaming activities, and/or their participation in competitive electronic game tournaments, and the like. Typically, the individuals who voluntarily choose to participate through a sponsor recognize that they have a "gambling problem" that puts their financial well-being at risk, and they are motivated to seek assistance. Individuals are credit card holders that use a variety of commercial credit facility-issued credit cards in order to wager online, in casinos, or to pay online electronic gaming fees. The System of this disclosure provides an underlying single, safe and responsible credit facility for all of the cards issued to each user.

The user subscriber retains possession of credit cards issued to the user, but the System and related method limit the available aggregate credit of the user for the purposes of wagering and online electronic gaming.

The System and related method, including the software coding and actuarial bases of the transaction platform, afford a user with protection from irresponsible wagering and electronic gaming credit spending by sharing the user's spending activities with all of the credit providers in real time. The compulsive gambler and/or electronic gaming player is protected by the identification of gambling risk patterns and/or electronic gaming habits. It assists the gambler and/or electronic gaming player, the licensed sportsbooks and the electronic gaming and iGaming platforms by providing information in real time about an individual user's betting and electronic gaming patterns. The method and system provide a "risk backstop" when needed to prevent betting or electronic game playing on occasions when it is beyond the individual user's financial capacity.

Each user is also able to verify and/or rate the payment history of the online wagering and/or electronic gaming platform patronized and earn loyalty points from the platform providers, as well as other incentives associated with the user's patterns of play.

In the description that follows, the acronym SWATS is used for convenience as a proprietary shorthand for the descriptor Secure Wagering and Transaction System, also referred to as "the System". Participation in SWATS enables a user to protect himself or herself from irresponsible wagering and electronic gaming credit spending by sharing the user's gaming expenditures with all of the user's credit providers in real time. The system protects a compulsive gambler and/or electronic gaming player by identifying the individual's gambling risk patterns and/or internet gaming habits. The system provides information and guidance in real time to not only the casino gambler and/or iGaming player, but also to the participating licensed casinos, sportsbooks, naming and the electronic gaming platforms that require such information and guidance concerning an individual's betting and electronic gaming patterns in order to establish and maintain a limit on the user's losses.

In an embodiment, an individual that has recognized, and admits to having a gambling problem, or by virtue of having been denied unrestricted access to a credit card account by the issuer, as a precondition voluntarily subscribes to join and participate in the System as a user subscriber.

Other subscribers to the System can include brick and mortar casino operators, so-called bingo parlors, online sportsbooks, poker and bingo operators and other types of gaming and iGaming providers. For convenience, this class of subscribers may be referred to as "operators" or operator subscribers. Another class of subscribers are the one or more credit and/or debit card issuers with which the individual user has an established account, a bank or other financial services organization from which the individual user is authorized to withdraw funds, e.g., from a savings account, a cash account or as a loan that is collateralized, e.g., by equities and/or bonds held in the individual user's account. Members of this latter group are referred to generally as a credit facility.

A further class of subscribers can include credit rating agencies that wish to monitor the individual user's gambling and gaming activities, at least so far as they are reflected by the data available from the System.

As will be understood from the above preliminary description, as a subscriber, the individual user benefits by voluntarily agreeing to establish as a condition of participating, a limit on, or maximum amount of gambling/gaming losses and/or tournament entry fees that can be accrued among the one or more subscriber credit facilities where the user has an established credit account and a specified maximum dollar line of credit. The individual user's gambling and/or gaming activities will be limited to those organizations that are subscribers to SWATS monitoring and control system which is the subject of this disclosure.

The benefits to the subscriber credit facilities are the prospect of reducing uncollectable bad debts from credit card holders who have become insolvent as a result of gambling debt and have no liquid assets or realistic prospects for repaying their debt.

Subscriber casino and online gaming operators also minimize the risks associated with uncollectable bad debts, and may achieve some measure of goodwill derived from participation in the System which is intended to aid compulsive gamblers by avoiding the accrual of debt beyond the user's ability to repay. The participating operators may also attract additional patrons by virtue of there being a limited number of subscribing operators.

As will be explained in more detail below, the system and methods integrate coding, algorithms, and actuarial analyses that receive and process data provided by an individual user subscriber, along with that obtained from the subscriber gaming operators and a variety of financial rating agencies and credit facilities.

The System incorporates data collection, recording and computational modules to receive and store the individual user's personal information, including all relevant assets, credit source accounts and the user's personally-established maximum credit loss value. The elements of the system monitor in real time the available credit, winnings and losses during online gaming and gambling activities in order to inform and, if necessary, control the individual user's access to established cash and/or credit facilities. The system provides the user, the casinos, sportsbooks, and electronic gaming platforms with an individual user's financial capabilities and current capacity to draw down further on the user's credit facilities. The invention provides a "risk backstop" or "spending governor" to prevent betting or electronic game playing on occasions when it is beyond the individual's predetermined financial capacity.

In a preferred embodiment of the practice of the method and system of the present disclosure, the transmission of data relating to a user subscriber's requests and execution of gaming transactions, and their denials, referred to collectively as "transactional data", is available to all subscribers in real time. The availability of such access in real time provides obvious benefits to all subscribers in this disclosure. It will be understood, however, even in the absence of access to such transactional data in real time that the method and system will serve its intended purposes and will function to benefit the user subscriber by preventing the accrual of debt beyond the personalized predetermined credit limit. For example, within the context of operating a gaming platform, the operator can aggregate and store transactional data, and periodically download the data, e.g., at a prescribed time every twenty-four hours. This practice is adapted to the availability of the infrastructure utilized by the platform operator subscriber, as well as limitations imposed by its internet service provider(s). Such limitations are well known in the field and future infrastructure enhancements are expected. Thus, as used in this description and in the claims, the term "real time" is to be understood to mean both "substantially instantaneously" and as the transactional data is periodically transmitted in the ordinary course of business as it is aggregated by the operator subscriber(s) in accordance with scheduled periodic downloads.

The System also enables each user subscriber to verify-and/or rate the payment history of the online wagering and or electronic gaming platform(s) that the user patronizes. In an embodiment, the rating can be made available to other user subscribers, or its distribution be limited to the specific platform operator that is rated. The rating feature can be used by operator subscribers to enhance their games in order to improve user ratings.

The Application Process

The following is a general description of a step-wise method or procedure suitable for enrolling a prospective user as a SWATS subscriber. Other embodiments are described in more detail below. The prospective user subscriber downloads an application ("app") to a smart phone, smart television, a conventional computer, or game console, or accesses the System sponsor's website for the purpose of entering the user's personal information to complete the sponsor's electronic finable questionnaire form. In an embodiment of a preliminary verification procedure, the prospective user/applicant provides sufficient bank account information to permit the sponsor to make a small deposit or a withdrawal, e.g., one dollar, as an initial step in verifying the applicant's identity. The sponsor sends a text to the applicant with a code which is entered in the application as a second verification step.

Upon the successful dual authentication of the user/applicant's identity, the sponsor initiates a "hard pull" of the applicant's credit history from one or more credit rating bureaus or services. A proprietary algorithm processes the applicant's credit history along with other financial information and personal information retrieved by the sponsor from publicly available records as described in more detail below. This process produces a risk evaluation or "score". This score determines not only Whether a credit line will be extended to the applicant, but also the dollar amount of the credit line. If approved, the applicant/user will be informed immediately.

If the risk evaluation processing cannot be completed in real time, the user/applicant is promptly notified and provided with an estimate of when the decision will be sent. This is in contrast to the time of several days typically required for brick and mortar casino operators to respond to a prospective gambler's request for a credit line in advance of his arrival at the casino.

It is also to be understood that the bases for the determination of the risk evaluation or score has been disclosed to the gaming platform operators that have agreed to make their platforms available to approved user subscribers for play up to the credit limit established by the sponsor. It will be understood that each of the credit facilities identified by the prospective user can also participate in the System as subscribers and that, as such, each will be able to access the approved user's eventual gaming activities in real time.

Upon receipt of the response to a request for a credit threshold by a prospective user, the sponsor will retrieve credit history information and history for the individual from one or more credit bureaus. The credit bureau data is entered into a statistical model for processing along with other data to predict the probability of a default by the individual applicant and to set a threshold gaming credit limit. The limit will apply and be reported to all gaming platforms and venues subscribing to the system. These entities will be required to promptly report any draw down of the line of credit to prevent kiting as well as other activities proscribed by the sponsor. The sponsor will post the activity immediately against the player's threshold. As the user's history is accumulated, the patterns of both play and payment will be aggregated across all of the gaming platforms to use for further statistical refinement of the threshold calculations, and the potential modification of an existing threshold in the event of a request by the user. These calculations will be based on continuing actuarial tabulations of all data outputs received for further historical refinement.

The statistics used for refinement can consist of any standard Bayesian techniques, as well as more advanced machine learning methods, e.g., random forest, neural net or other ML methods, as dictated by the efficacy of the method based on the data available. These statistical methods are within the skill of the art.

Credit bureaus and other repositories that choose to participate as subscribers can receive or have access to periodic updates of the balance and settlement history of a given user for their own internal purposes. All participating subscribers will be able to pull the current balance and threshold information from the System on demand and in real time for any user that is also a user of their services for the purpose of setting limits on gaming activity and balances.

Each user will be able to request user gaming profile via the System and apply to the sponsor for corrections if any information is thought to be inaccurate. The requests will be honored if they can be shown to be in error.

The credit threshold Th is determined for the user during the sign-up or application process based on a proprietary credit threshold algorithm. The credit threshold algorithm uses a plurality of parameters in order to determine the user's credit threshold Th. Parameters can include the age of the user, financial information of the user, monthly spending, monthly salary, and credit score, among other factors, including criminal records and bankruptcy. In addition, the credit threshold algorithm, while determining the credit threshold for the user, can assign a weight to one or more parameters of the plurality of parameters. The user can request an increase or decrease in the credit threshold Th using the sponsor's website or the mobile application provided to the user.

DETAILED DESCRIPTION OF THE DISCLOSURE

Certain embodiments of the disclosure are directed to a method and SWATS integrated for use with multiple gaming systems. Various embodiments of the disclosure provide a method and system that simplify providing a line of credit to a user and making digital payments via different gaming portals. The System of the disclosure can be used by business subscribers to optimize their business strategies based on an individual user's history including such factors as where the user has played, with whom the user has played, and the types and frequency of games played. Information can be used in selecting incentives such as fee reductions for trying new games, focused souvenirs that are purchased online, affinity programs and the like.

As mentioned above, there are many gaming portals which have charges associated with the gameplay or wagering or other services. Such gaming portals must have means for accepting payment from their users.

Figure 1:
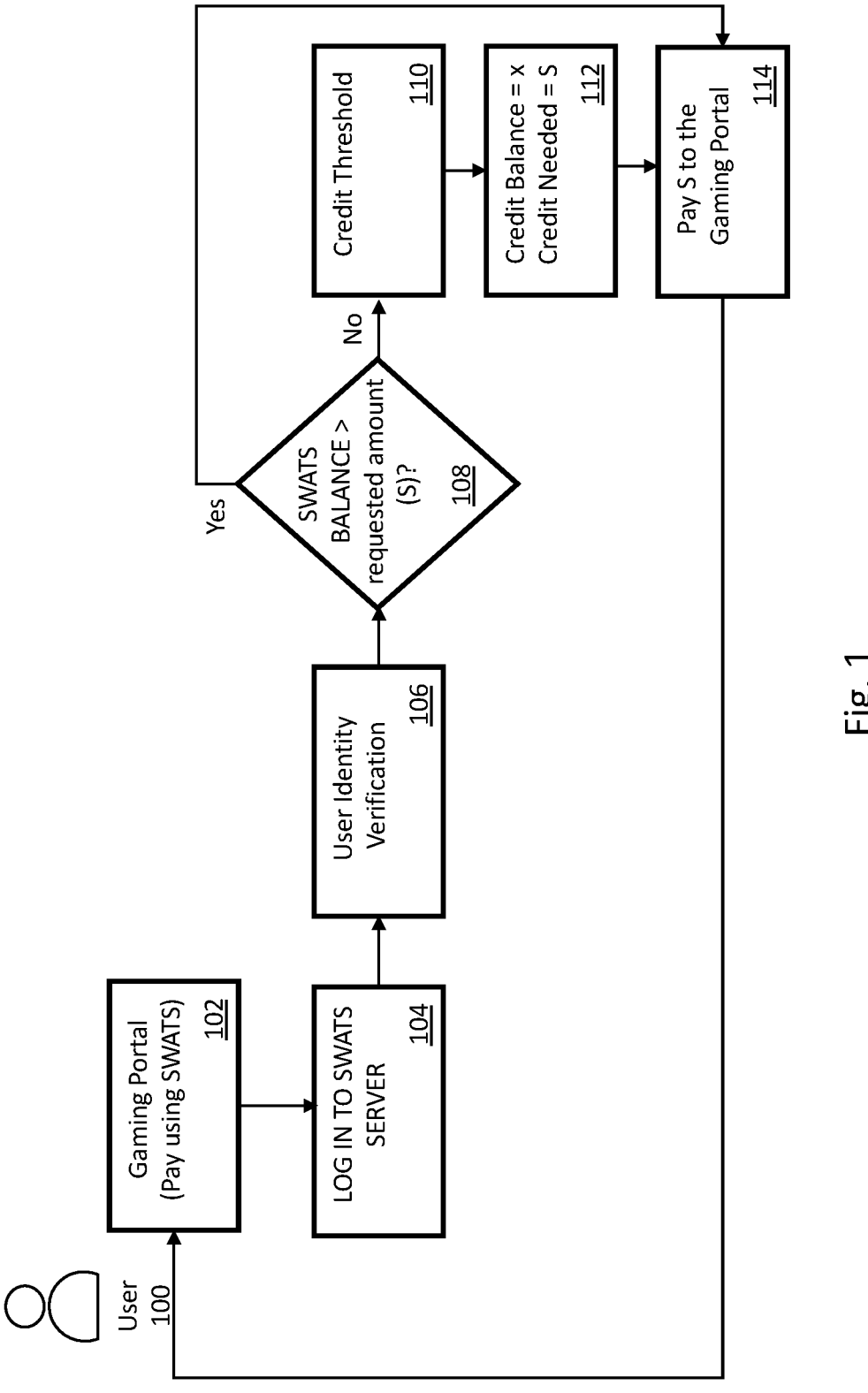
FIG. 1 is an exemplary process flow diagram of an embodiment in accordance with the present disclosure.

FIG. 1 is an exemplary process flow diagram in accordance with an embodiment of the present disclosure. There are one or more SWATS servers, hereafter referred as, "one or more servers," which are integrated to provide functionalities described in more detail below. Each of the gaming portals that wishes to participate in acceptance of payments via a user's SWATS account must request the SDKs and/or APIs (REST' API) from the one or more servers, which as described in more detail below, verify the request and, if approved, register the requesting gaming portal as a verified gaming portal in an associated memory device or a database.

The one or more servers can assign a unique identifier (ID) or a token to the verified gaming portal. By means of the SDKs or APIs (REST API), or the like, the verified gaming portals can integrate SWATS into their accepted payment methods. Further, any payment request made by the verified gaming portal is validated by the one or more servers based on a plurality of factors, one of which is the unique ID associated with the gaming portal requesting payment.

The user can access the SWATS by signing into a designated website, mobile application, or web portal, e.g., gaming portal. The user logs in to gain access to SWATS using either the website or the mobile application.

Referring now to FIG. 1, in operation, at Step 102, when a user wants to complete a transaction for an amount S, using the SWATS that has been integrated into a verified gaming portal, the user 100 is requested to submit login credentials associated with the user's account on the System. At step 104, the one or more servers the login request initiated by the user 100 and at step 106, the one or more servers verifies the user's identity based on user data stored in one or more databases.

Once the credentials of the user 100 are verified at step 106, the one or more servers determines at step 108 whether or not a cash balance C previously established by user 100 within the user's account on the System is sufficient to complete the transaction. There are two possible outcomes from the determination at step 108. In the first case, the user already has a cash balance C equal to or more than the transaction amount S in the System account. Accordingly, the one or more servers process the transaction request and make payment of the amount S to the verified gaming portal.

In the second case, at step 110, the available cash balance C in the system account is less than the transaction amount S. In such a case, the one or more servers compares the difference of S minus C, with a credit balance X of the user. The credit balance can be a value between zero and up to a credit threshold Th. The credit threshold Th is the maximum value of the credit balance allocated to the user 100 of the SWATS.

In step 112, the amount S minus C is deducted from the credit balance X and the one or more servers which also act as a single source of truth, records the transaction. The transaction is also stored in the user's profile database. The available credit balance is updated to show the new value of the cash balance of C plus X minus S.

In step 114, the one or more servers completes the transaction by paying the verified gaming portal the amount S. In addition to the above-described process, all of the transactions have an added layer of security. Each of the transactions that are executed using the SWATS are authenticated using two-factor authentication (2FA). There are various techniques for the execution of 2FA such as biometrics, SMS-based, and push-notification based. The SWATS can utilize one or more of these, or other methods, for the execution of 2FA.

Once the payment is received by the gaming portal, the user can access the gameplay or place a bet, or purchase the service desired, and the transaction is completed.

Figure 2:
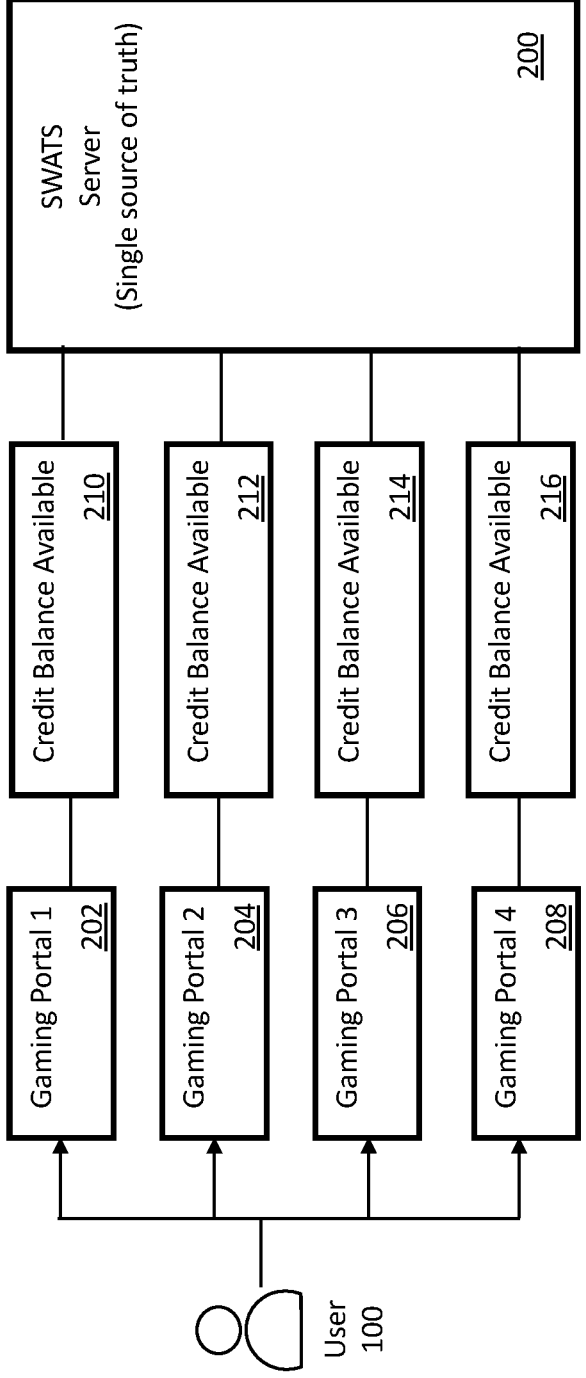
FIG. 2 illustrates application of the SWATS by a user in accordance with an exemplary embodiment of the disclosure.

Referring now to FIG. 2, there is illustrated an application of the SWATS by a user in accordance with an exemplary embodiment of the disclosure With the user 100 sequentially accessing a plurality of gaming portal(s) 1 to 4 (202, 204, 206, 208).

In an exemplary scenario, the user 100 has a credit balance of $100 and the user makes a payment of $50 at the gaming portal 1 (202), after which the user's credit balance is updated to $50. All of these entries are simultaneously entered in the ledgers stored in the one or more servers. In a preferred embodiment, blockchain technology can also be used to record all the financial transactions. Blockchain provides a decentralized immutable and tamper-proof database that can be relied upon in the event that a dispute arises among any of the subscribers and/or the sponsor.

After playing on 202, the user 100 sequentially plays on the gaming portals 204 and 206 and in total spends $50 at these gaming portals. The updated credit balance after the play of the gaming portals (202, 204, 206) is $0. Accordingly, when the user initiates a transaction on the gaming portal 4 (208), the transaction is declined, and the user receives a corresponding notification. The notification can be a change in User Interface (UI), the display of a message, such as "Credit balance exhausted," a push notification, or a vibration of a handheld device in a specific pattern, on which the SWATS is installed. The user is restricted from further accessing any of the verified gaming portals while the credit balance is exhausted.

In an embodiment, the user can be denied access the gaming portals for a predetermined period of time that serves as a "cooling off" period. By way of example, a "cooling off" period may be appropriate if the user had been under the influence of alcohol or other judgment impairing substance. Alternatively, access can be regained when the user pays down the SWATS against the used credit balance by adding value from an outside source. The System thus promotes more responsible wagering during gaming by limiting or preventing a user's impulse to exceed the user's own preestablished personalized credit limit.

Figure 3:
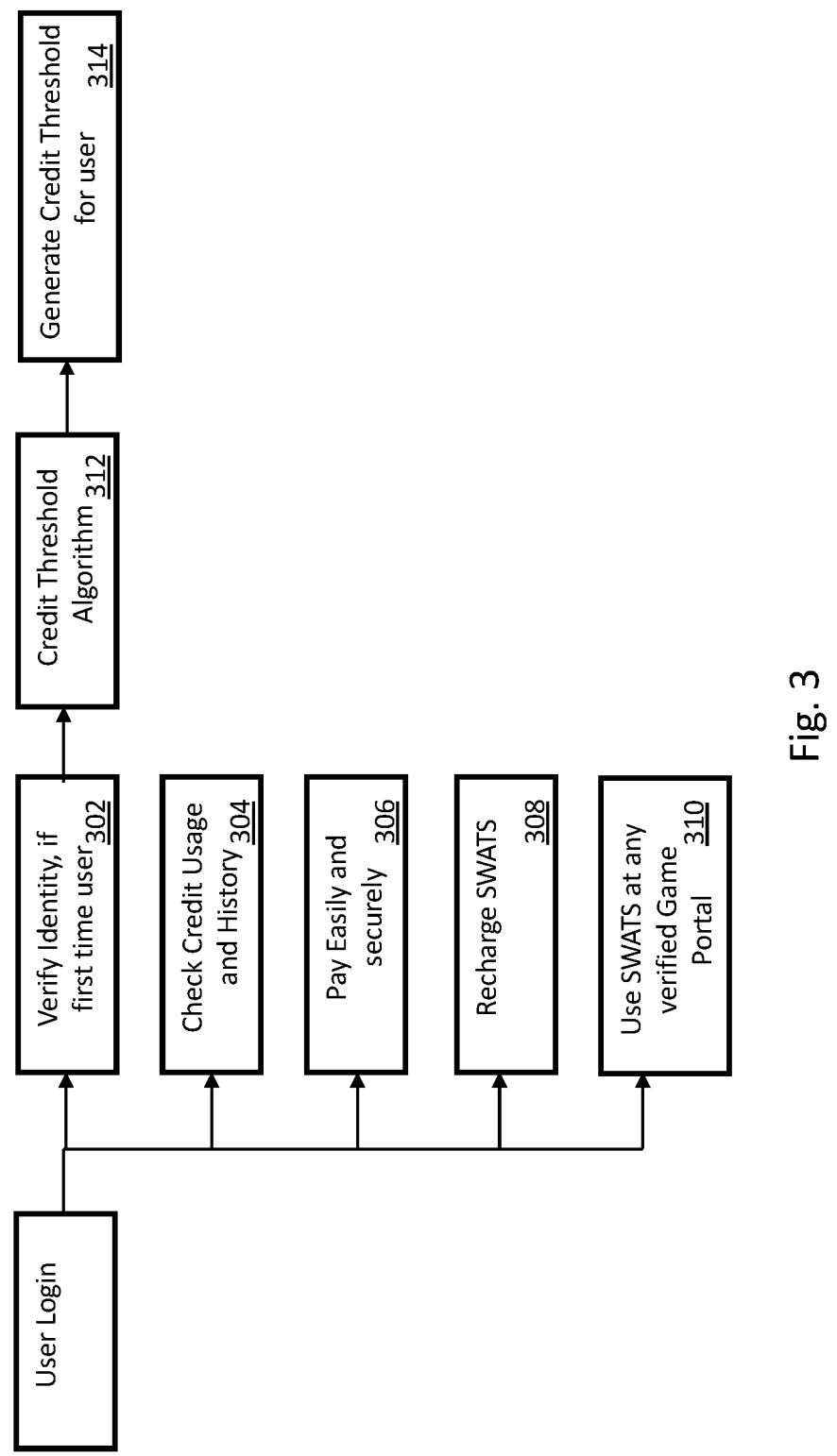
FIG. 3 is a process flow diagram for a first-time user of the SWATS and other functionalities of the SWATS in accordance with an exemplary embodiment of the disclosure.

FIG. 3 illustrates a typical process flow for a first-time user of SWATS, and other functionalities of the System in accordance with an exemplary embodiment that illustrates various options when the new user accesses the SWATS website or mobile application. At the first login, the identity of the new user is verified. As described earlier, a credit threshold has been determined for the new user as calculated by the credit threshold algorithm. As explained above, the credit threshold algorithm employs a plurality of parameters, including the age of the applicant, financial information, monthly spending, monthly salary, credit score, and the like. Personal information such as marital and family status, driving, police and court records, and other publicly available information can be included in the algorithm database. In addition, the credit threshold algorithm can assign a weight to one or more of these parameters. In addition, the one or more servers determining the credit threshold can retrieve one or more parameters related to the applicant or the new user from one or more external sources.

In accordance with the exemplary scenario, there are various other functions that the new user can access following identity verification and after the credit threshold is determined for the new user, and these functions continue to be available to users of SWATS that remain in good standing based on predetermined criteria.

Each user of SWATS can review at any time the user's entire transaction history and the credit usage across multiple gaming portals (304).

By accessing the payment function (306), the user can enter a payment directly via a website or a portal.

The user is provided with the opportunity to pay down or replenish the SWATS balance at (308) using other direct payment methods such as a debit card, internet banking, PayPal®, and the like. Additionally, the user is given an option to make payments against the credit line. In the event that the user fails to repay the credit balance after a predetermined period of time, the user account may be blocked from further activity.

As indicated (310), once registered, the user can proceed with transactions on any of the verified gaming portals as explained in detail in connection with FIG. 1.

In accordance with another embodiment, the user can also provide ratings to one or more other SWATS users who are playing the same game. The SWATS is integrated with a plurality of participating subscriber gaming platforms and includes the functionality of recording user ratings. There are various ways to curate a rating for a user, for example, the one or more servers can utilize a consensus algorithm to determine the rating of the user. When determining a rating by a user, the weight given to a rating entered by a new user can be different than the weight accorded the rating entered by a user who has had more experience with the particular gaming portal being rated and entered a higher rating. Optionally, the ratings entered by each of the users of SWATS are advantageously stored on a blockchain system. The storage of ratings using blockchain technology avoids allegations of improper or unauthorized action by a central authority that might otherwise be able to, or be suspected of influencing the rating process. Accordingly, users can be assured that the ratings are not subject to tampering and are trustworthy. This procedure can be implemented by processing blockchain transactions in a backend related to the one or more servers, i.e., a part of the system that is not directly accessed by the user. The SWATS and backend can communicate using a REST API. The blockchain transactions, as well as the private keys, are generated by the backend. The keys are stored in a centralized database operatively connected to the one or more servers. After signing, the transactions are sent to a blockchain node, e.g., an Ethereum node, which can be run by the backend itself.

The rating system can include any number of objective and/or subjective criteria, e.g., ease of use, response time, level of action, and the like. Ratings can be, e.g., from 1 to 5. SWATS also provides the option for each user to enter a rating for a specific gaming portal. This helps other users to determine whether they wish to play on a particular gaming portal. Operators can also benefit by determining what factors are important to users for the purpose of future upgrades to their operation.

The operating subscribers or owners of the gaming portals have access to the ratings entered by users. In addition to the user's ratings, these subscribers can also request the user's credit balance and the other user activities from the one or more servers in real time. These activities include where the user has played, with whom the user has played, and the types of games played. The gaming portals can act on this information to develop various business strategies as described above using the history of individual user's activities.

Figure 4:
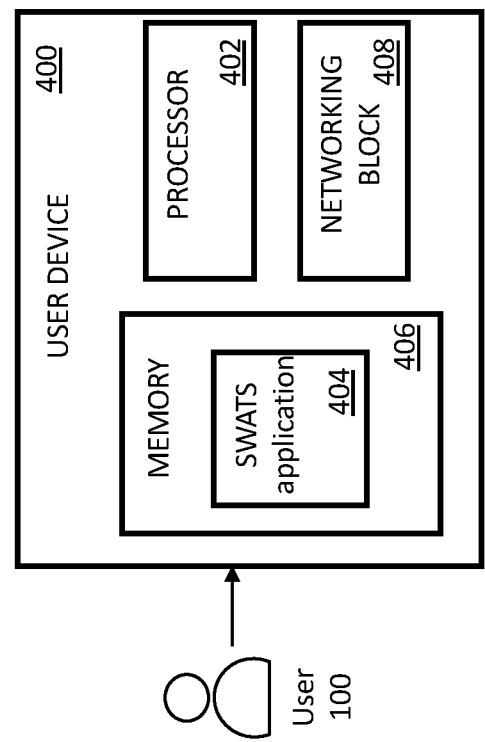
FIG. 4 is a diagram that illustrates an exemplary user device with a downloaded SWATS application.

FIG. 4 is a diagram that illustrates an exemplary user device (400) with a SWATS application (404) stored in the memory (406). The user device (400) includes at least a processor (402), memory (406), and a networking block (408), the networking block (408) being a network protocol used to forward a block device such as a hard disk or partition from one computer to a second computer. The user device (400) can include various other components which are not shown in the figure. The user (300) can run the SWATS application on the processor (402) stored in the memory (406). The application (404) is operatively linked to the one or more servers via the networking block (408).

Figure 5:
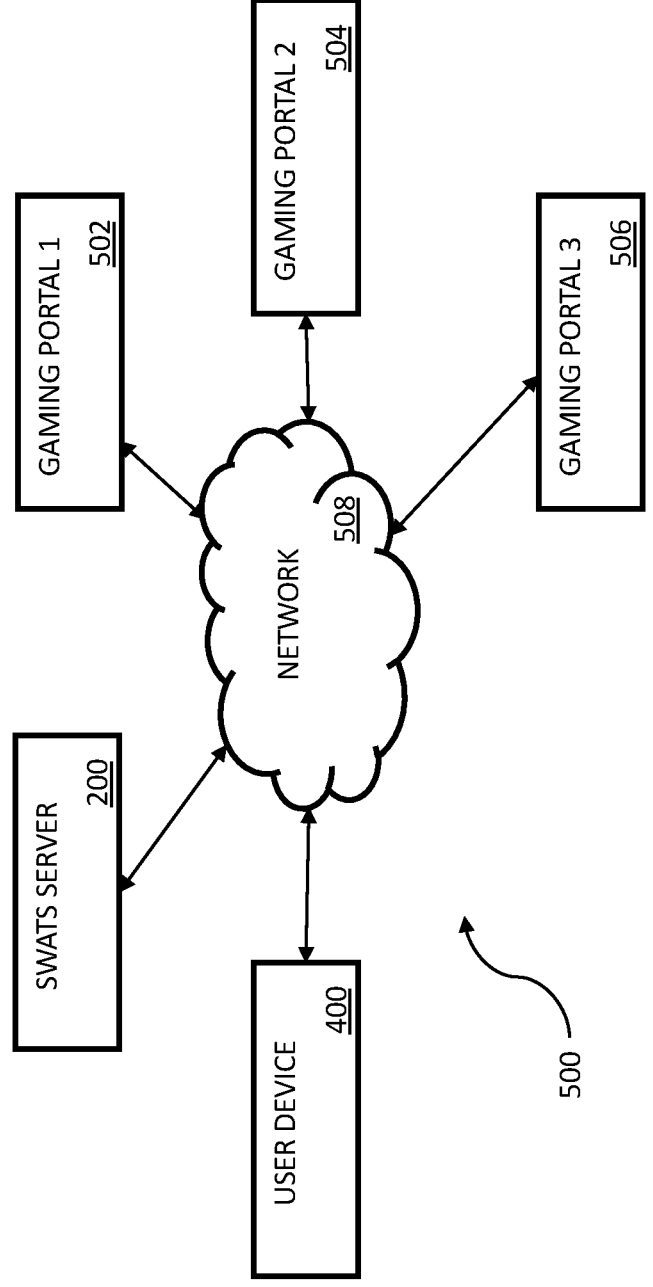
FIG. 5 is a networking environment diagram in accordance with an embodiment of the disclosure.

FIG. 5 illustrates networking environment (500) in accordance with an exemplary embodiment of the disclosure. The user device (400), the SWATS server (200), and gaming portals 1-3 (502, 504, 506) communicate with each other via the network (508). Additional databases and/or servers (not shown) can optionally communicate via the network (508).

EXAMPLES

The following describes in more detail an embodiment in which an experienced individual online gambler who may or may not be familiar with the functioning and purpose of SWATS is initially solicited to become a subscriber user. The solicitation of interest is originated or issued by an established operator, e.g., Draft Kings®, that is a SWATS subscriber and has some historical information about, players that have used the platform, including relative frequency and duration of play, as well as the amounts wagered and the extent of losses by the individual player.

The solicitation of interest can be couched in such terms as "Would you like to play now and pay later?' that appears on the screen of the electronic device used to access the operator's platform, accompanied by a "Yes" icon that can be clicked on by the player. Upon clicking on the "Yes" icon, a link is displayed to the sponsor's interactive fillable form that includes the legally required disclosure of information in the context of the "terms and conditions" that will govern the relations between the player and the sponsor in the event that the player elects to become a SWATS user subscriber. The agreement includes broad consent to the electronic storage, or "caching" of the user's financial information that is derived from the initial disclosure by the prospective user subscriber, including the user's customary sources of funds and/or credit used to support play, as well as the platforms on which the individual plays, or plans to play in the future. As this point, the player who proceeds will have accepted the commitment to voluntarily control the dollar value of gambling/gaming debt that is to be accrued within this predetermined credit limit.

In order to verify the identity of the individual applicant before proceeding further with the processing of an application, the sponsor initiates a two-step or dual authentical procedure, such as requesting bank account information and password(s) and completing a low value transaction via the internet, e.g., a small cash deposit to the account and after receiving its confirmation, sending a coded password to the applicant's cell phone that must be entered in the application form in order to continue the application process. If either of these dual authentical verification steps is unsuccessful, the player will be so advised and the application process is terminated. Optionally, it may be suggested that the player try again at another time, while identifying the sponsor's website and providing an Internet address, and/or global phone number authentication for easy access to the application process again.

Assuming that the dual authentication is successful in verifying the individual's identify, the applicant may continue the process by providing information identifying additional credit facilities relied upon by the applicant to support wagering activities. Since this information may not be readily available at the time of the initial application processing, or for other reasons, the applicant can request a "pause", be provided with an access code for use within a prescribed period of time, and return to the site within that time to complete the application process.

Once the application has been completed with the relevant information which includes specified "personal information", as well as credit facilities such as those described above, the data is entered for processing in the previously-described proprietary algorithm that provides a credit rating or "score".

If the applicant fails to achieve an acceptable score, a notification is issued immediately with a polite rejection message in accordance with any relevant governmental regulations and, optionally, a suggestion that an application can be made at a future date. If the score is acceptable, the applicant is so notified, and is assigned a unique user subscriber identification number. In an embodiment, a login procedure is established as additional security for access to SWATS for returning to play after a predetermined period of time has passed following a prior play session.

It will be understood that the same protocol can be established by operators or organizers of competitive electronic game tournaments where individual participants pay an entry fee to compete against each other for a predetermined schedule of prizes. The operators of these types of tournaments maintain participant lists and can use that information to identify frequent players and the accumulated entry fees that they have paid in selecting which players to solicit for subscriber membership as a user of SWATS. The application procedure, determination of the credit "score", and establishment of a credit threshold for a subscriber user are substantially the same as described above.

The principal advantage to the user is that the System serves to establish and inform the user of a maximum gambling "allowance" so that the user's net worth is not jeopardized. In an embodiment, the System is programmed to send the user an audible and/or a visual signal when the user is near or over the prescribed credit limit. The visual signal can take the form of an icon, such as a waving red flag. Or the signal can be a vibration if the user is employing a cell phone to play.

Equally important is that SWATS informs in real time not only the user, but also other subscriber casinos and gaming operators of the amount of credit that a given user can be put at risk by wagering on any given transaction so as not to exceed a limit that has previously been voluntarily established by the user in the context of factors that are relevant to the user's overall financial and personal circumstances. By denying or limiting the amount of a given wager before it has been placed, the subscriber operator eliminates or minimizes the risk of incurring a "bad debt", i.e., one that is not collectable in whole or in part. In addition, subscribing businesses have a full purview of the user's behavior and ratings based on the user's prior acceptance during the application process of the terms and conditions.

The system and method for SWATS integrated with one or more gaming systems, has several advantages, including (1) the secure payment option affording ease of use by the user; (2) the availability of a credit line for the user; and (3) the promotion of responsible gaming and wagering by restriction of the use of the SWATS after exhaustion of the predetermined credit balance. In addition, the System users can check the rating of any gaming portal before paying to play, as well as the ratings of games available on any given portal.

The invention claimed is:

1. A method for operating a secure wagering and transaction system to establish a line of credit for a user of the system to employ for gambling within one or more gaming portals, the method comprising the steps of:

a) registering the user with the secure wagering and transaction system;

b) setting an initial credit balance X for the user to a credit threshold, wherein the credit threshold is calculated based upon a plurality of parameters, including the user's age, credit score, monthly salary, monthly rent or mortgage expense, monthly food expense, monthly health insurance and medical expenses, one or more of the plurality of parameters being received from the user, and other parameters of the one or more of the plurality of parameters being received from one or more external sources;

c) modifying the credit threshold upon a change in the plurality of parameters provided by the user and from the one or more external sources to generate a modified credit threshold and resetting the credit balance X to the modified credit threshold;

d) comparing a cost S of a gambling transaction requested by the user with a cash balance C previously established by the user within the secure wagering and transaction system, e) wherein if the cost S is less than or equal to the cash balance C, updating the cash balance C within the secure wagering and transaction system to a new value $C-S$, authorizing the gambling transaction and skipping to step h), f) comparing the difference $S-C$ to the credit balance X previously established within the secure wagering and transaction system, g) wherein if the difference $S-C$ is less than or equal to the credit balance X, updating the cash balance C to zero, updating the credit balance X within the secure wagering and transaction system to a new value $C+X-S$, and authorizing the gambling transaction, h) wherein if the secure wagering and transaction system has authorized the gambling transaction, processing the transaction request and making payment of the cost S of the gambling transaction to a gaming portal, and wherein if the secure wagering and transaction system has not authorized the gambling transaction, declining the transaction request.

2. The method of claim 1, wherein a source of the user's credit score is a credit facility to which the user gains access by virtue of a preexisting contractual relationship.

3. The method of claim 2, wherein the access to the credit facility is a credit card or debit card issued to, and held by the user.

4. The method of claim 2, wherein the access to the credit facility is via a home equity line of credit.

5. The method of claim 1, wherein the credit threshold is reviewed upon a request by the user, and recalculated based upon changes in the plurality of parameters.

6. The method of claim 1, wherein the credit threshold is continually reviewed and modified based upon the user's patterns of play and payment.

7. A secure wagering and transaction system for establishing a line of credit for a user to employ for gambling within a gaming portal, the system comprising:

an interface configured to receive a request from the user via the gaming portal to place a gambling transaction having a cost S, a processor coupled to the interface;

a non-volatile memory having program code stored thereon, the program code operable when executed by the processor to:

setting an initial credit balance X for the user to a credit threshold, wherein the credit threshold is calculated based upon a plurality of parameters, including the user's age, credit score, monthly salary, monthly rent or mortgage expense, monthly food expense, monthly health insurance and medical expenses, one or more of the plurality of parameters being received from the user, and other parameters of the one or more of the plurality of parameters being received from one or more external sources;

modifying the credit threshold upon a change in the plurality of parameters provided by the user and from the one or more external sources to generate a modified credit threshold and resetting the credit balance X to the modified credit threshold;

perform a first comparison of the cost S of the gambling transaction requested by the user with a cash balance C previously established by the user within the secure wagering and transaction system, wherein if the first comparison showed that the cost S was less than or equal to the cash balance C, update the cash balance C within the secure wagering and transaction system to a new value $C-S$, and authorize the gambling transaction, wherein if the first comparison showed that the cost S was greater than the cash balance C, perform a second comparison of the difference $S-C$ to the credit balance X previously established within the secure wagering and transaction system, and if the second comparison showed that the difference $S-C$ was less than or equal to the credit balance X, update the cash balance C to zero, update the credit balance X within the secure wagering and transaction system to a new value $C+X-S$, and authorize the gambling transaction, wherein if the gambling transaction was authorized by either the first comparison or, if conducted, the second comparison, process the transaction request and make payment of the cost S of the gambling transaction to the gaming portal, and otherwise decline the transaction request.

8. The system of claim 7, wherein the credit threshold is reviewed upon a request by the user, and recalculated based upon changes in the plurality of parameters.

9. The system of claim 7, Therein the credit threshold is continually reviewed and modified based upon the user's patterns of play and payment.

10. The system of claim 7, wherein the user's line of credit is obtained from one or more credit facilities that are subscribers to the system, and each credit facility has access in real time to the user's gaming activities on a gaming portal that is also a subscriber to the system, to the wagering transactions in which the user has participated, and to historical winnings and losses of the user on subscriber portals.

\*   \*   \*   \*   \*